Feb. 14, 1967            L. LEE II            3,303,642
MOTOR
Filed June 4, 1965
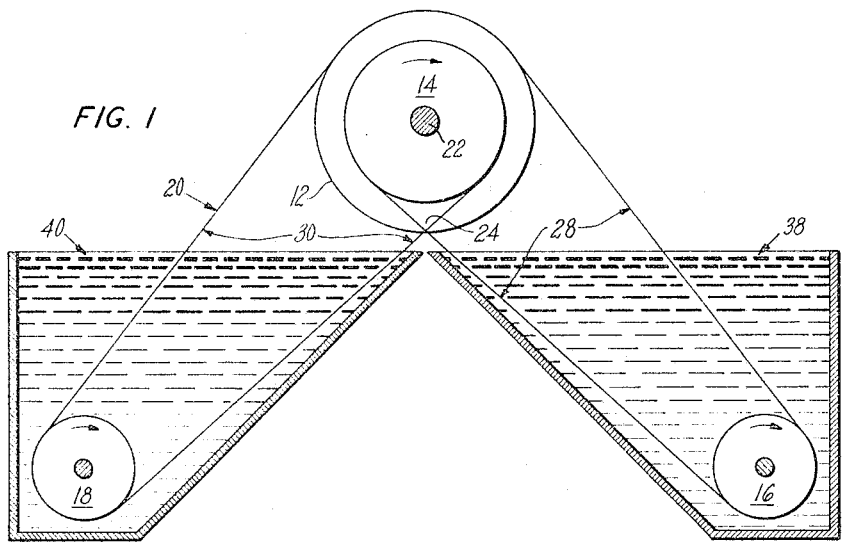
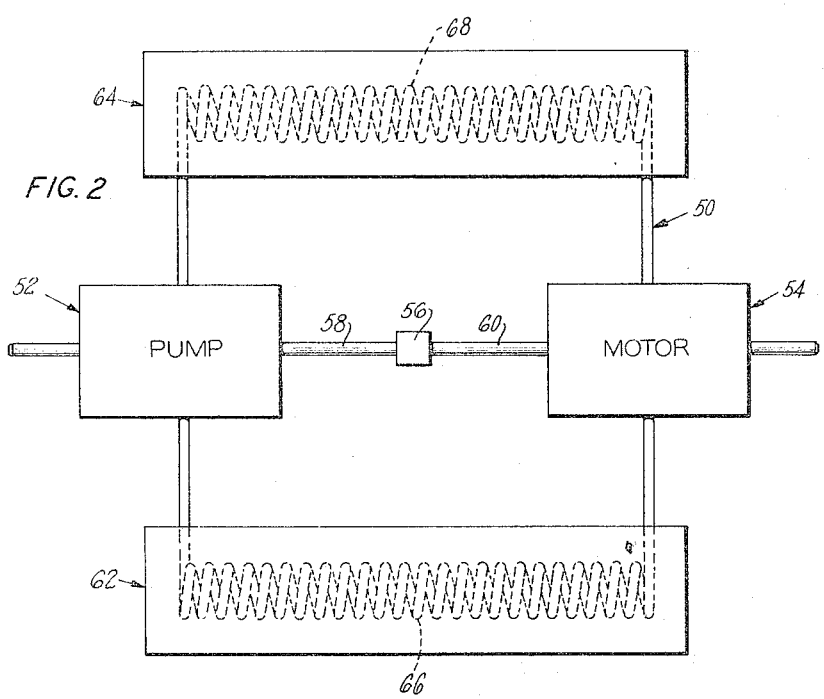
INVENTOR.
LEIGHTON LEE, II
BY *Lindsey, Prutzman and Hayes*
ATTORNEYS United States Patent Office 3,303,642
Patented Feb. 14, 1967

3,303,642
MOTOR
Leighton Lee II, Guilford, Conn., assignor to The Lee Company, Westbrook, Conn., a corporation of Connecticut
Filed June 4, 1965, Ser. No. 461,251
8 Claims. (Cl. 60—23)

The present invention primarly relates to energy conversion systems for translating one form of energy, for example thermal energy, into a usable mechanical output and more particularly relates to a motor which employs an energy conversion system in a novel manner through the expansion and contraction of portions of an endless circuit of a force transmitting medium.

It is a primary aim of the present invention to provide a novel energy conversion system which is adapted for directly converting thermal energy into a usable mechanical output by the continuous expansion and contraction of different portions of an endless circuit of a force transmitting medium. In accordance with this aim, the force transmitting medium may, for example, be an endless belt which is adapted to be expanded by heating and which is adapted to be contracted by cooling, or for example the force transmitting medium may be a hydraulic fluid which likewise is adapted to be expanded and contracted by being heated and cooled.

It is another aim of the present invention to provide a new and improved motor which is driven by the differential force resulting from the relative expansion and contraction of a driving medium.

It is a further aim of the present invention to provide a motor which employs a novel belt and wheel arrangement for converting thermal or chemical energy into a usable mechanical output.

It is another aim of the present invention to provide a motor having a novel hydraulic system which employs an endless hydraulic circuit and a hydraulic pump-motor combination for converting thermal energy into a usable mechanical output.

It is another aim of the present invention to provide a new and improved motor which is adapted to operate by the relative heating and cooling of different portions of an endless circuit of a force transmitting medium.

It is a further aim of the present invention to provide a motor of the type described which may be adapted to provide a relatively high torque low speed output or a relatively low torque high speed output.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

In the drawing:

FIG. 1 is a generally diagrammatic view, partly broken away and partly in section, of a first embodiment of a motor of the present invention; and FIG. 2 is a generally diagrammatic view of a second embodiment of a motor of the present invention.

In accordance with the present invention, an endless circuit of a force transmitting medium adapted to be expanded and contracted by the application of thermal or chemical energy is employed for translating the thermal or chemical energy into a mechanical force. For this purpose different portions of the endless circuit of the force transmitting medium are thermally or chemically expanded and contracted to develop a force to displace the force transmitting medium along the endless circuit from the portion of the circuit where the medium is expanded (the expansion station) to the portion of the endless circuit where the medium is contracted (the contraction station). For ensuring that the resultant displacement of the force transmitting medium in the circuit is in one direction only, a driving element is employed to drive or return the force transmitting medium from the contraction station to the expansion station. As the force transmitting medium is in its contracted state when it is driven from the contraction station to the expansion station of the circuit, the work or energy consumed in driving the force transmitting medium from the contraction station to the expansion station is the product of the differential force across the driving element times the displacement of the force transmitting medium in its contracted state.

For obtaining a usable output, a driven element is connected to be driven by the force transmitting medium as it moves around the circuit from the expansion station to the contraction station. The medium is therefore in its expanded state while it drives the driven element, and thus the gross work or energy output of the driven element is the product of the differential force across the driven element times the displacement of the medium in its expanded state. As the medium is in its contracted state as it is driven and as the medium is in its expanded state as it drives the driven element, the work or energy required to operate the driving element is less than the gross work or energy obtained by the driven element, the difference between the two being the net usable work or net output of the system. The driving and driven elements thereby together provide a transducer for translating the mechanical forces in the force transmitting medium into a usable mechanical output.

By directly coupling the driving element to the driven element, the transducer can be operated so that the rate of displacement of the force transmitting medium in its contracted state is less than the rate of displacement of the force transmitting medium in its expanded state. And, by appropriately relating these rates of displacement, the transducer can be adapted to provide a relatively high torque low speed output with a relatively large difference in the rates of displacement and to provide a relatively low torque high speed output by a relatively small difference in the rates of displacement.

Referring now to the drawings in detail, a first embodiment of the motor of the present invention shown in FIG. 1 employs a wheel arrangement which functions as the transducer, and a belt which functions as the force transmitting medium, and which together provide for converting thermal or chemical energy into a usable mechanical output. The arrangement includes a compound wheel having a pair of wheels 12, 14 with relatively large and small diameters, respectively, and a pair of idler wheels 16, 18. The endless belt 20 which may, for example, be formed as a cable or strap, is preferably tautly supported on these wheels by passing the belt about the relatively large diameter wheel 12, thence around the idler wheel 16, thence around the relatively small diameter wheel 14, thence around the idler wheel 18, and finally back to the relatively large diameter wheel 12. In the embodiment shown, the wheels 12, 14 are affixed to a driven or output shaft 22 and are thereby adapted to rotate together in the same angular direction. For this reason, the endless belt 20 is mounted so as to pass in the same direction around the wheels 12, 14 as they rotate. Accordingly, with the idler wheels 16, 18 laterally spaced as seen in FIG. 1, the portions of the endless belt passing onto and off the wheel 14 cross at 24, and for this reason the idler wheels 16, 18 may also be axially spaced to prevent contact or rubbing by the belt portions at the crossing at 24.

Thus, with the wheels 12, 14 rotating in the clockwise direction as seen in FIG. 1, the portion 28 of the endless belt passing from the wheel 12 to the wheel 14 slackens, and the portion 30 of the endless belt passing from the wheel 14 to the wheel 12 becomes more taut. The reverse is also true. That is, by contracting the portion 28 of the endless belt and by expanding the portion 30 of the endless belt, the compound wheel comprising the wheels 12, 14 can be caused to rotate. This contraction and expansion of spaced portions of the endless belt provides a differential force tending to rotate the wheel 12 in the clockwise direction, as seen in FIG. 1, and to rotate the wheel 14 in the counterclockwise direction. However, as the differential force acting on the wheels 12 and 14 is the same, and the diameter of wheel 12 is greater than the diameter of the wheel 14, the driving torque acting on the wheel 12 is greater than the torque necessary to counteract the counterclockwise torque on the wheel 14. Thus, the compound wheel comprising the wheels 12, 14 functions as a transducer for translating the forces of the endless belt into a usable rotary mechanical output. The relative diameters of the wheels 12, 14, or the relative linear rates of displacement of the belt with the wheels 12, 14, determines whether the transducer will provide a relatively high torque low speed output or a relatively low torque high speed output. Thus, if the difference in diameters is relatively large, the transducer will provide a relatively high torque low speed output whereas if the difference in diameters is relatively small the tansducer will provide a relatively low torque high speed output.

The manner in which the portions 28 and 30 of the endless belt are contracted and expanded respectively may be readily accomplished by immersing these portions of the endless belt into two separate baths 38, 40 which are adapted by either chemical or thermal means to contract and expand the endless belt. In the case of using thermal means, the bath 38 would operate as a heat sink to cool and thereby contract the endless belt, and the bath 40 would operate as a heat source to heat and thereby expand the endless belt. In such an arrangement it would be desirable to use an endless belt made out of a suitable material having a high coefficient of thermal expansion and preferably a low coefficient of thermal conductivity. Alternatively, the belt portions 28 and 30 could be contracted and expanded through the use of a suitable material which expands when wetted and which contracts upon drying. Further, it should be noted that the contraction and expansion of the portions 28, 30 of the endless belt are relative only and in the case of thermal expansion and contraction of the belt, either bath 38, 40 could be at ambient temperature and the other bath be above or below ambient temperature as appropriate.

Referring now to FIG. 2, a second embodiment of a motor of the present invention is shown comprising a closed endless hydraulic circuit, generally designated by the numeral 50, the motor employing a hydraulic fluid as the force transmitting medium. This embodiment of the motor also comprises a positive displacement hydraulic pump 52 which pumps the hydraulic fluid along the circuit and a positive displacement hydraulic motor 54 which is driven by the hydraulic fluid as it flows along the circuit. The hydraulic pump and hydraulic motor are shown in axial alignment and being directly coupled by a coupling 56 to mechanically connect the imput shaft 58 of the pump to the output shaft 60 of the motor.

The hydraulic circuit is preferably filled with a suitable hydraulic fluid having a relatively high coefficient of thermal expansion, and a pair of heat exchangers 62, 64 which includes a pair of coils 66, 68, respectively, are used for contracting and epanding the hydraulic fluid. The heat exchangers preferably employ, as in the embodiment of FIG. 1, liquid baths in which the coils 66, 68 are immersed. The liquid bath for the heat exchanger 62 therefore functioning as a heat sink for cooling and thereby contracting the hydraulic fluid and the liquid bath for the heat exchanger 66 functioning as a heat source for heating and thereby expanding the hydraulic fluid.

The expansion and contraction of the hydraulic fluid creates a differential pressure across the motor 54 and pump 52. And, as connected, the volumetric displacement of the motor 54 is greater than the volumetric displacement of the pump so that the expanded hydraulic fluid passing from the heat source to the heat sink will develop sufficient torque to operate the pump for pumping the contracted hydraulic fluid from the heat sink to the heat source and to provide an additional usable output.

The hydraulic fluid may be heated and cooled in any one of a number of well-known ways, preferably without a physical change of state of the hydraulic fluid and with the hydraulic pressure of the fluid in the circuit maintained at a minimum level. For example, the hydraulic circuit could employ liquid sodium as the hydraulic medium and a suitable atomic reactor as a thermal source.

It should be realized that in both of the embodiments described the weight or mass movement of the force transmitting medium in the circuit is the same across the driven element as it is across the driving element during continuous operation of the motor. Where desirable, however, suitable spring biased idler wheels may be employed in engagement with the belt portions 28 and 30 in the embodiment of FIG. 1, and suitable accumulators may be connected to the hydraulic circuit in the embodiment of FIG. 2, to provide for alleviating variations in the mass rates of movement during the operation of the motor. Also, it should be noted that by changing the relative displacement of the motor 54 and the pump 52, the motor output can be varied to provide either a relatively high torque low speed output or a relatively high speed low torque output.

Thus, it can be seen that the motor of the present invention employs an endless force transmitting medium which may be an endless belt, as in the embodiment of FIG. 1, or which may be a hydraulic fluid, as in the embodiment of FIG. 2. And, by merely heating and cooling portions of the endless circuit of the force transmitting medium either continuously to provide continuous operation or intermittently to provide intermittent operation, a usable mechanical output can be obtained. This usable mechanical output can be either a relatively high torque low speed output or a relatively low torque high speed output. Additionally, by directly coupling the driving and driven elements of the transducer, and by properly relating the driving and driven elements and the rates of expansion and contraction of the force transmitting medium, the motor can be adapted to provide a substantially constant output. Further, the motor is adapted for operation by any energy source which can be used to expand and contract the force transmitting medium.

As will be apparent to persons skilled in the art, various modifications and adaptations of the structure above described will become readily apparent without departure from the spirit and scope of the invention, the scope of which is defined in the appended claims.

I claim:

1. An energy translation system comprising a force transmitting medium adapted for movement around an endless circuit and for expansion and contraction by the addition and removal of energy thereto, and a transducer operable in conjunction with the expansion and contraction of the force transmitting medium having driving means in operative association with said medium for driving the force transmitting medium in one direction around the endless circuit and driven means in operative association with said medium for being driven by the force transmitting medium as it moves around the endless circuit in said one direction, said driving and driven means being coupled and being in operative association with said medium at spaced positions in the endless circuit to provide intermediate circuit portions therebetween where the force transmitting medium is adapted to be expanded and contracted respectively, said transducer being operable to drive the force transmitting medium at a first rate of displacement around the circuit and for being driven by the force transmitting medium as it moves at a second rate of displacement around the endless circuit which is greater than the first rate, the displacement of the force transmitting medium around the endless circuit being accompanied by expansion and contraction of the force transmitting medium in the intermediate circuit portions by the addition and removal of energy.

2. The energy translation system of claim 1 wherein the force transmitting medium is a hydraulic fluid in a closed endless circuit, wherein the driving means is a positive displacement pump for pumping the hydraulic fluid around the circuit in said one direction, wherein the driven means is a positive displacement motor driven by the hydraulic fluid as it moves around the circuit in said one direction, and wherein the pump and motor are coupled to provide a greater rate of displacement by the motor than by the pump.

3. The energy translation system of claim 1 wherein the force transmitting medium is an endless belt, wherein the driving means and driven means are driving and driven wheel means respectively receiving the belt, and wherein the driving and driven wheel means are connected so that the rate of displacement of the belt around the driving wheel means is less than the rate of displacement of the belt around the driven wheel means.

4. A motor comprising an endless circuit of a force transmitting medium adapted for movement around the endless circuit and capable of being expanded and contracted by heating and cooling the force transmitting medium respectively, a transducer having driving and driven rotary devices in positive operative connection with the force transmitting medium at spaced positions along the endless circuit to provide a pair of intermediate circuit portions therebetween, said driving and driven rotary devices being coupled and respectively being adapted for driving the force transmitting medium at a first rate of displacement and for being driven by the force transmitting medium at it moves around the circuit at a second rate of displacement greater than the first rate, whereby by heating and cooling the force transmitting medium at the intermediate circuit portions respectively, the force transmitting medium is expanded and contracted to develop forces on the driving and driven rotary devices for operating the transducer.

5. A motor for converting thermal energy into a usable mechanical output comprising a transducer having a positive displacement hydraulic motor portion, a positive displacement hydraulic pump portion, and means positively coupling the hydraulic motor portion and the hydraulic pump portion for common operation and so that the motor portion is operative with a greater hydraulic displacement than the pump portion; a closed endless hydraulic circuit connecting the hydraulic motor portion and hydraulic pump portion in series and having a first hydraulic circuit portion between the motor outlet and the pump inlet and a second hydraulic circuit portion between the pump outlet and the motor inlet, and means for cooling the first hydraulic circuit portion and for heating the second hydraulic circuit portion, the hydraulic circuit having a substantially incompressible hydraulic force transmitting medium which is adapted to be expanded and contracted by heating and cooling respectively whereby the hydraulic medium is expanded in the second hydraulic circuit portion and contracted in the first hydraulic circuit portion to positively drive the hydraulic motor portion and with the motor portion and through the coupling means operate the hydraulic pump portion to positively pump the hydraulic medium from the first to the second hydraulic circuit portions at substantially the same mass rate as it passes through the motor portion from the second to the first circuit portions and to thereby provide for directly and continuously translating thermal energy into a usable mechanical output.

6. The motor of claim 5 wherein the first hydraulic circuit portion includes a cooling coil and the second hydraulic circuit portion includes a heating coil.

7. A motor comprising, wheel means including driving and driven wheels coupled to provide relatively low and high peripheral speeds respectively, a pair of spaced idler wheels, an endless belt passing from the driving wheel to a first of the idler wheels, to the driven wheel, to the second of the idler wheels and back to the driving wheel, said belt being adapted for expansion and contraction, means for expanding the section of the belt passing from the driving wheel around said first idler wheel to the driven wheel, and means for contracting the section of the belt passing from the driven wheel around the second idler wheel to the driving wheel.

8. The motor of claim 7 wherein the driving and driven wheels are coaxially mounted for common rotation and have relatively small and large diameters respectively.

References Cited by the Examiner

UNITED STATES PATENTS

| | | | |
|---|---|---|---|
| 1,602,068 | 10/1926 | Daub | 60—23 |
| 2,059,155 | 10/1936 | Thoma | 60—53 |
| 2,166,940 | 7/1939 | Conradson | 60—52 |
| 2,820,348 | 1/1958 | Sauter | 60—59 |
| 2,874,533 | 2/1959 | Schott | 60—53 X |
| 3,169,375 | 2/1965 | Velthuis | 60—1 |
| 3,229,177 | 1/1966 | Clarke | 60—23 X |

EDGAR W. GEOGHEGAN, *Primary Examiner.*